Oct. 17, 1939.    L. FULLER ET AL    2,176,173
ELECTRIC SECONDARY BATTERY
Filed Dec. 17, 1938
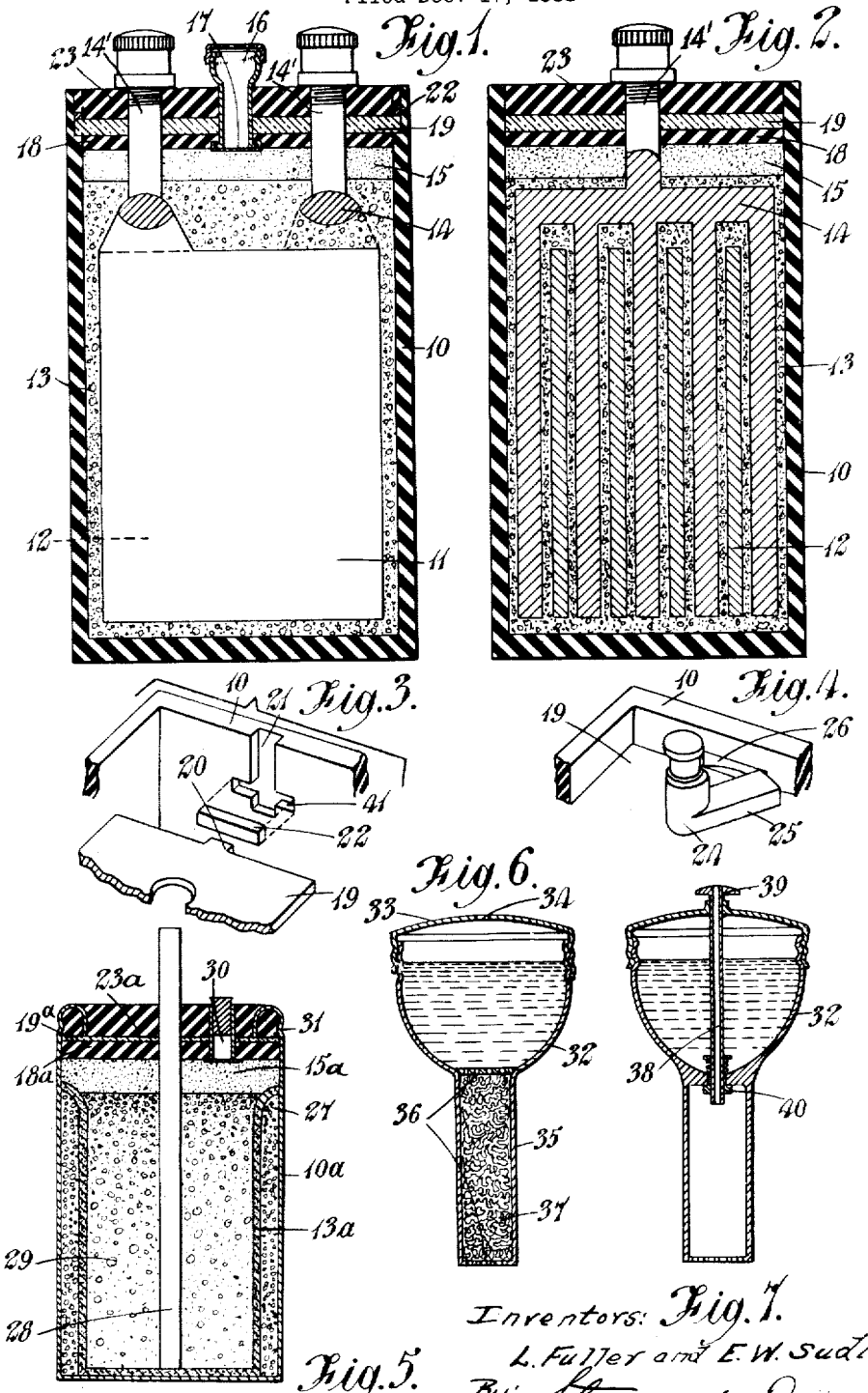
Inventors:
L. Fuller and E. W. Sudlow
By: Strauss and Davis
Attorneys Patented Oct. 17, 1939

2,176,173

UNITED STATES PATENT OFFICE 2,176,173

ELECTRIC SECONDARY BATTERY

Leonard Fuller, London, and Edmund William Sudlow, Ilford, England

Application December 17, 1938, Serial No. 246,436
In Great Britain August 21, 1937

5 Claims. (Cl. 136—6)

This invention relates to electric secondary batteries, and in particular, to the so-called dry type of secondary battery wherein the electrolyte is completely absorbed in the electrodes conjointly with a porous medium surrounding and separating said electrodes.

The object of this invention is to provide improvements in the manufacture and construction of such batteries whereby an increased capacity per unit bulk or weight is obtained, and means also whereby this increased capacity is maintained during the life of the battery, whether it be left standing for long inactive periods or subjected to a large number of charging and discharging cycles, or whether it be subjected to abnormal charging rates.

Previously suggested batteries of the dry secondary type have been found to lose their capacity under any of the above-mentioned conditions at a rate and in a degree approximately proportionate to their solidity and recent research in connection with batteries of this type has disclosed that their capacity per unit bulk or weight may be considerably increased by ensuring that the manufactured battery shall be as compact as possible and contain no air or free electrolyte, and, moreover, that such an increase in capacity may be maintained during the later life of the battery by providing means in its construction whereby a conservation of its internal pressure is obtained and its constant optimum solidity is assured. In a method of producing a so-called dry secondary battery of the type comprising, in a container, positive and negative electrodes, the active materials of which substantially absorb all of the electrolyte conjointly with a porous separator surrounding said electrodes, the present invention is characterized by the fact that the battery is constructed under sufficient pressure to exclude all air and/or free electrolyte therefrom, and that one or more sealing layers substantially prevent subsequent movement of the internal structure of the battery, said sealing layer or layers being provided with positive locking means to maintain the solidity of the cell.

In view of the necessity of obtaining complete solidity with an absence of air or free electrolyte it is important that more than ordinary care should be exercised in the selection of materials for the separator.

The primary considerations which should govern this selection are the flexibility of the material, its porosity, and its ability to prevent contact between the negative and positive electrodes or particles therefrom at all times. If the selected material possesses these essentials in the required degree the thickness of their application becomes of secondary importance limited only by the mechanical strength and elasticity of the separating layer or coating.

Suitable separating materials are known which consist of powdered pumice, kieselguhr or the like substances, mixed with electrolyte to form a paste which may be applied by any convenient means.

An improved secondary battery of the so-called dry type may be constructed by coating or completely covering the compressed negative and positive electrodes with a layer of separator material, such as those above described, and subjecting them to pressure so as to exclude all air and free electrolyte from the plate or grid block and inserting the whole into a container made of suitable material, such as for example ebonite, glass, or synthetic resin condensation product or the like. The exposed surface of the coated electrodes is then completely covered with a layer of powdered or granular material, such as sand, which is then compressed and covered in turn with a layer of pitch, or other suitable material, leaving only a space for a vent which is pressed into close contact with the sand surface and which is provided with a perforated lead plate or gauze at its lower extremity so as to prevent the escape of any particles of the granular material whilst still permitting free passage for the gases.

This layer of pitch, while still soft or semi-hardened, is then covered with a lid of ebonite, or other suitable material, and the whole is subjected to pressure and retained in the position obtained by locking the ebonite lid with the outer container in any suitable manner.

Complete solidity having now been obtained, a final layer of pitch is applied to effect optimum sealing.

As an added safeguard against the escape of granular particles from the sand surface, which if not prevented would cause a loosening of the internal construction and a resultant loss of efficiency, the vent passage may be filled with glass-wool or like material held in position by an upper and lower lead screen or gauze as will be hereinafter described.

In a further modification of this invention the vent may be provided with means whereby spare water may be carried on the battery so that the replacement of water which is necessitated by the gaseous evolution may be performed either automatically or manually at predetermined intervals.

By these means one of the primary causes of automobile starter battery breakdown, namely lack of water or electrolyte during operation, may be eliminated and the battery kept at its optimum efficiency.

This modification may be carried into effect in a variety of ways, a suggested method being to provide a hollow or cup-like vent with a screw-top, a hole being provided in said top to allow the gases to escape, the upper or cup-like portion of the vent being capable of containing sufficient spare water to provide for the requirements of the battery over fairly extensive periods. By this method the replacement of water continues proportionately to the rate of evaporation and gaseous evolution, so that the battery receives automatic attention until the cup becomes emptied.

Another means whereby a similar effect may be obtained would be to provide a hollow water-filled vent, milar to the above type, but differing therefrom in that it is also provided with a hollow plunger tube which, when depressed, permits the release of the desired amount of water to compensate for the loss through gaseous escape which latter occurs unhindered through the hollow tube.

This principle may be further modified according to this invention by placing the cup or container portion of the vent below the uppermost layer of pitch so that it may thus extend over almost the whole horizontal surface area of the battery. The spare water in this case would be admitted through the normal vent orifice, and the sealing provided by the superimposed layer of pitch would prevent leakage and still permit the battery to be used in any position, which is one of the features of this type.

A typical secondary battery of the so-called dry type made in accordance with this invention is hereafter described with reference to the accompanying drawing, which is included as explanation and is not intended to limit the invention thereto, in which drawing:

Figures 1 and 2 are sectional side and end elevations respectively of a plate type battery;

Figure 3 is a fragmentary perspective view, exploded to show the details of the locking means in Figures 1 and 2;

Figure 4 is a similar view showing a modified arrangement;

Figure 5 is a sectional elevation of another form of battery having concentric electrodes; and Figures 6 and 7 are sectional elevations to an enlarged scale showing alternative forms of vents arranged to carry spare water.

In Figures 1 and 2, an outer container, 10, made of ebonite contains the pasted and compressed negative and positive electrodes, 11 and 12 respectively, which have each been coated upon all their surfaces with a layer of porous separator material, 13, such as powdered pumice, kieselguhr or the like mixed with electrolyte to form a paste, and then packed together under pressure so as to form an air-free block completely covered with separator material. This block is designed to fit into the container 10 as tightly as possible, allowing only space for convenient assembly, and all spaces around the block and up to the tops of the usual terminal bridges, 14, are filled with separator material under pressure so that all air is excluded and no free electrolyte is present.

A layer of sand, 15, is then applied to the upper or exposed surface of the separator material and highly compressed, whereupon a vent, 16, provided at its lower end with a cap of perforated lead or gauze, 17, is forced into close contact with the sand, so that that particular area of sand which is immediately below the vent 16 and which is ordinarily subject to disintegration because the gases are evolved at that point, is always kept compressed and undisturbed. A layer of pitch, 18, is then applied to the remaining portion of the sand surface and is allowed to harden partially. When this pitch layer is in the desired condition, a lid of ebonite 19, provided with two or more lugs 20 (see Figure 3), which are adapted to slide in slots 21, situated in the corresponding inner surfaces of the outer container, 10, is superimposed thereon and the whole is subjected to pressure, whereupon the lugs 20 of the ebonite plate reach the lowest extremity of the slots 21 and are thereafter held in that position by inserting separate pieces of ebonite 22 into transverse slots 41. The ebonite lid 19 is then finally covered with another layer of pitch 23, so that a completely solid and air-free cell is obtained.

Another improved method of obtaining this positive sealing and maintenance of rigidity in connection with this type of battery is shown in Figure 4, wherein a cylindrical sleeve of ebonite, 24, is provided with a tongue or lug 25 extending radially from its base, and is adapted to fit pivotally over each terminal 14' and rest upon the ebonite lid 19, which is in position on the lower pitch layer, so that when pressure is applied to the ebonite lid its final position may be retained by turning the ebonite sleeve 24, until the lug 25 thereon engages within the transverse slot 26, formed in the corresponding inner surfaces of the outer container 10.

The application of the foregoing principles to a small secondary cell of the so-called dry type is shown in Figure 5, wherein a cylindrical outer container 10a, is made of lead, and is pasted internally with negative active material 27, the latter being coated with a layer of porous separator material, indicated at 13a. A positive electrode comprises a central lead core 28 surrounded with finely divided positive active material 29 which is rammed or compressed against the separating layer 13a and the positive core 28 under the influence of a pressure which is sufficient to ensure complete absence of air, or pockets where free electrolyte can accumulate. A layer of sand 15a is then applied to the exposed surfaces of the separator 13a and positive active material 29 and compressed. A layer 18a of pitch is then applied to the sand surface, leaving only space for a vent 30 which is in close contact with the sand for the purpose aforesaid. As in the plate type battery this pitch layer 18a is allowed to partially harden before receiving an ebonite lid 19a, and after pressure is applied to said ebonite lid the position thus obtained is held and locked against subsequent movement by first forming a corrugation 31 adjacent the top of the outer container 10a and above the ebonite lid 19a, and then rolling over the upper edge of the outer container 10a until it meets the exposed surface of the ebonite lid 19a. The inner surfaces of this rolled edge or beading may be perforated so that when the final layer of pitch 23a is applied it may flow into the interior of the beading as shown and cover the remaining portion of the ebonite surface thus assisting in the positive locking of the lid 19a.

By these methods a secondary cell is produced which is substantially dry and completely solid and air-free, and which, therefore, possesses considerably increased capacity and the ability to maintain same for long periods even when severely mishandled electrically.

An improved form of vent according to this invention is shown in Figure 6, in which a hollow or cup-like container, 32, is adapted to accommodate spare water and is fitted with a screw-top 33 provided with a hole 34 therein to allow the gases to escape without hindrance. The lower end of the vent is formed with a stem 35 having at its upper and lower ends, caps 36 of perforated lead or gauze, which may, if desired, enclose a loose pad of glass-wool 37, so as to allow free passage for the gases whilst still preventing the escape of any granular particles from the sand surface in order to preserve the internal rigidity of the cell.

A slightly modified form of vent is shown in Figure 7. In this case a tubular plunger 38 is provided at its upper end with a knob or button 39, and at its lower extremity with a spring-loaded valve 40, clearance being allowed between the plunger 38 and the bottom of the container 32, so that, when the knob 39 is depressed, the valve 40 opens to permit the water to flow into the cell to replace the loss of water caused by the evolution of gases. Free passage for the gases is always provided through the hollow plunger 38 and a corresponding hole in the knob 39.

What we claim is:

1. In a secondary battery comprising a casing completely filled with electrodes and separating material, non-conductive material covering the upper surface of the filling comprising the electrodes and separating material for sealing said filling within the casing a rigid closure for maintaining said filling under pressure within said casing, locking means cooperating with said closure and casing for maintaining said closure in position, and a vent extending through said closure and in contact with the upper surface of said filling, said vent having means for preventing the passage of solid substances but permitting the passage of gases and liquids.

2. In a secondary battery comprising a casing a filling within said casing comprising electrodes and separating material, and a closure sealing said filling within said casing, a vent extending through said closure and in contact with the upper surface of said filling, said vent comprising a reservoir for containing compensating electrolyte, a valve for controlling the passage of said electrolyte to said battery filling, said valve having a channel extending therethrough to pass gases outwardly at all times, and means in the vent for preventing the passage of solid particles but permitting the passage of gases and liquids.

3. A so-called dry secondary battery comprising a casing, a filling within said casing which comprises a positive electrode and a negative electrode, porous separating material completely filling the remaining space in the casing, a rigid closure member applied under pressure to said filling, and locking means comprising an arm pivotally mounted upon a terminal lug carried by one of the electrodes and engaging the closure member, said arm being adapted to enter a recess formed in the interior surface of the casing so as to positively hold the closure member in position and thus maintain the components under compression.

4. A so-called dry secondary battery comprising a casing, a filling within said casing which comprises a positive electrode and a negative electrode, porous separating material completely filling the remaining space in the casing, a layer of porous, non-conductive material covering the upper surface of the electrodes and separating material, liquid electrolyte wholly absorbed by the electrodes, a rigid closure member applied under pressure to said filling, and locking means comprising a projection formed upon the closure member and arranged to engage with a recess in the casing, a locking member adapted to engage laterally extending recesses in the casing to lock the projection within its recess and hold the closure member in position whereby to maintain the components of the battery under pressure.

5. A so-called dry secondary battery comprising a casing, a filling within said casing which comprises a positive electrode and a negative electrode, porous separating material completely filling the remaining space in the casing, a rigid closure member applied under pressure to said filling, and locking means comprising an inwardly directed corrugation formed in the casing to overlie the edges of the closure member and the edges of the casing being formed over to bear against the closure member to hold said closure member in position so as to maintain the components under pressure, and thermoplastic material overlying the closure member and surrounding the turned over edges.

LEONARD FULLER.
EDMUND WILLIAM SUDLOW.

CERTIFICATE OF CORRECTION.

Patent No. 2,176,173.  October 17, 1939.

LEONARD FULLER, ET AL.

It is hereby certified that error appears in the printed specification of the above numbered patent requiring correction as follows: Page 3, second column, lines 24 to 28 inclusive, claim 4, strike out the words and comma "a layer of porous, non-conductive material covering the upper surface of the electrodes and separating material, liquid electrolyte wholly absorbed by the electrodes,"; and that the said Letters Patent should be read with this correction therein that the same may conform to the record of the case in the Patent Office.

Signed and sealed this 5th day of December, A. D. 1939.

(Seal)

Henry Van Arsdale,
Acting Commissioner of Patents.

siderably increased capacity and the ability to maintain same for long periods even when severely mishandled electrically.

An improved form of vent according to this invention is shown in Figure 6, in which a hollow or cup-like container, 32, is adapted to accommodate spare water and is fitted with a screw-top 33 provided with a hole 34 therein to allow the gases to escape without hindrance. The lower end of the vent is formed with a stem 35 having at its upper and lower ends, caps 36 of perforated lead or gauze, which may, if desired, enclose a loose pad of glass-wool 37, so as to allow free passage for the gases whilst still preventing the escape of any granular particles from the sand surface in order to preserve the internal rigidity of the cell.

A slightly modified form of vent is shown in Figure 7. In this case a tubular plunger 38 is provided at its upper end with a knob or button 39, and at its lower extremity with a spring-loaded valve 40, clearance being allowed between the plunger 38 and the bottom of the container 32, so that, when the knob 39 is depressed, the valve 40 opens to permit the water to flow into the cell to replace the loss of water caused by the evolution of gases. Free passage for the gases is always provided through the hollow plunger 38 and a corresponding hole in the knob 39.

What we claim is:

1. In a secondary battery comprising a casing completely filled with electrodes and separating material, non-conductive material covering the upper surface of the filling comprising the electrodes and separating material for sealing said filling within the casing a rigid closure for maintaining said filling under pressure within said casing, locking means cooperating with said closure and casing for maintaining said closure in position, and a vent extending through said closure and in contact with the upper surface of said filling, said vent having means for preventing the passage of solid substances but permitting the passage of gases and liquids.

2. In a secondary battery comprising a casing a filling within said casing comprising electrodes and separating material, and a closure sealing said filling within said casing, a vent extending through said closure and in contact with the upper surface of said filling, said vent comprising a reservoir for containing compensating electrolyte, a valve for controlling the passage of said electrolyte to said battery filling, said valve having a channel extending therethrough to pass gases outwardly at all times, and means in the vent for preventing the passage of solid particles but permitting the passage of gases and liquids.

3. A so-called dry secondary battery comprising a casing, a filling within said casing which comprises a positive electrode and a negative electrode, porous separating material completely filling the remaining space in the casing, a rigid closure member applied under pressure to said filling, and locking means comprising an arm pivotally mounted upon a terminal lug carried by one of the electrodes and engaging the closure member, said arm being adapted to enter a recess formed in the interior surface of the casing so as to positively hold the closure member in position and thus maintain the components under compression.

4. A so-called dry secondary battery comprising a casing, a filling within said casing which comprises a positive electrode and a negative electrode, porous separating material completely filling the remaining space in the casing, a layer of porous, non-conductive material covering the upper surface of the electrodes and separating material, liquid electrolyte wholly absorbed by the electrodes, a rigid closure member applied under pressure to said filling, and locking means comprising a projection formed upon the closure member and arranged to engage with a recess in the casing, a locking member adapted to engage laterally extending recesses in the casing to lock the projection within its recess and hold the closure member in position whereby to maintain the components of the battery under pressure.

5. A so-called dry secondary battery comprising a casing, a filling within said casing which comprises a positive electrode and a negative electrode, porous separating material completely filling the remaining space in the casing, a rigid closure member applied under pressure to said filling, and locking means comprising an inwardly directed corrugation formed in the casing to overlie the edges of the closure member and the edges of the casing being formed over to bear against the closure member to hold said closure member in position so as to maintain the components under pressure, and thermoplastic material overlying the closure member and surrounding the turned over edges.

LEONARD FULLER.
EDMUND WILLIAM SUDLOW.

CERTIFICATE OF CORRECTION.

Patent No. 2,176,173.      October 17, 1939.

LEONARD FULLER, ET AL.

It is hereby certified that error appears in the printed specification of the above numbered patent requiring correction as follows: Page 3, second column, lines 24 to 28 inclusive, claim 4, strike out the words and comma "a layer of porous, non-conductive material covering the upper surface of the electrodes and separating material, liquid electrolyte wholly absorbed by the electrodes,"; and that the said Letters Patent should be read with this correction therein that the same may conform to the record of the case in the Patent Office.

Signed and sealed this 5th day of December, A. D. 1939.

(Seal)      Henry Van Arsdale,
Acting Commissioner of Patents.